No. 634,477. Patented Oct. 10, 1899.
O. H. ROBERTSON.
CATTLE STANCHION.
(Application filed Nov. 11, 1898.)
(No Model.)
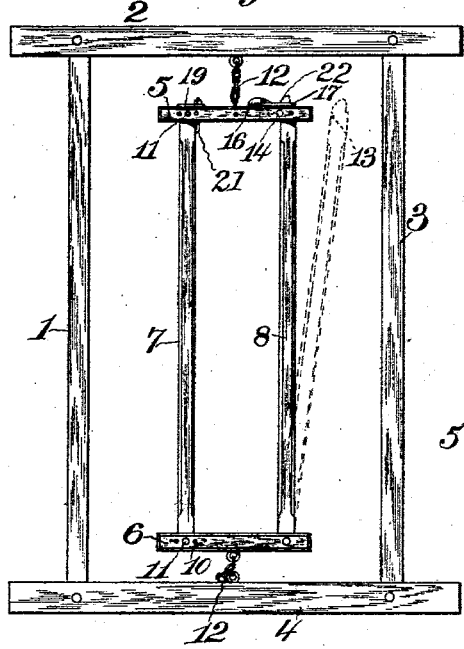
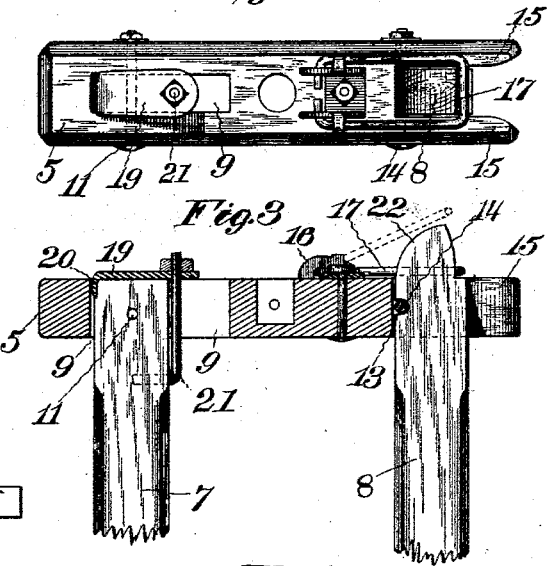
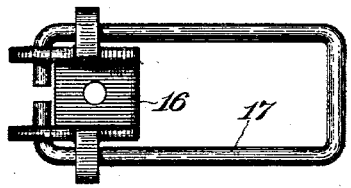
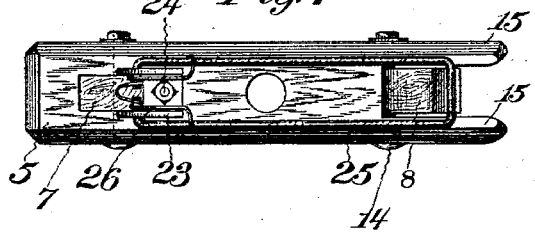
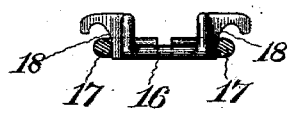
Witnesses:
William H. Barker.
Emma P. Coffin.
Inventor:
Oliver H. Robertson
By Chas. L. Burdett,
Attorney
THE NORRIS PETERS CO., PHOTO-LITHO., WASHINGTON, D. C.

UNITED STATES PATENT OFFICE.

OLIVER H. ROBERTSON, OF FORESTVILLE, CONNECTICUT.

CATTLE-STANCHION.

SPECIFICATION forming part of Letters Patent No. 634,477, dated October 10, 1899.

Application filed November 11, 1898. Serial No. 696,175. (No model.)

*To all whom it may concern:*

Be it known that I, OLIVER H. ROBERTSON, a citizen of the United States, and a resident of Forestville, in the county of Hartford and State of Connecticut, have invented certain new and useful Improvements in Cattle-Stanchions, of which the following is a full, clear, and exact description, whereby any one skilled in the art can make and use the same.

My invention relates to the class of devices used for securing a creature in a stall or like place in a manner to allow more or less freedom of motion whether the animal be standing or lying; and the object of my invention is to provide a simple, strong, and durable device of this class and one that may be adjusted to accommodate itself to necks of varying sizes.

To this end my invention consists in the device as a whole, in the combination of parts, and in the details of parts and their combination, as hereinafter described, and more particularly pointed out in the claims.

Referring to the drawings, Figure 1 is a front view of a stanchion embodying my improvement. Fig. 2 is a top view of the same on enlarged scale. Fig. 3 is a detail front view, in lengthwise section, through the top cross-bar on enlarged scale. Fig. 4 is a detail top view, on enlarged scale, of the spring-latch and latch-plate. Fig. 5 is a detail side view of the same. Fig. 6 is a detail end view of the same with the spring-latch cut in section. Fig. 7 is a top view of a stanchion, showing a modified form of the invention on enlarged scale.

In the accompanying drawings the numerals 1, 2, 3, and 4 denote the framework of a stall of ordinary construction to which the stanchion is secured.

The stanchion proper consists of a top cross-bar 5, a bottom cross-bar 6, and side or neck bars 7 and 8. The neck-bar 7 is secured to the top and bottom cross-bars in a manner to provide for adjustment toward or from the neck-bar 8. In the form shown this neck-bar projects into mortises 9 in each of the cross-bars, and holes 10 are provided for the reception of a bolt 11. The top and bottom cross-bars are secured to the frame of the stall in the ordinary manner, as by means of a flexible connection 12. The neck-bar 8 is pivoted to the bottom cross-bar at its lower end and has a notch 13 near its upper end engaging with a bolt 14, extending through the top bar 5. This top cross-bar is bifurcated, forming prongs 15, between which the neck-bar 8 rests, and the bolt 14 is so placed as to serve the double purpose of holding the neck-bar 8 from lengthwise movement and also support the prongs to prevent splitting of the neck-bar. A latch-plate 16 is secured to the top cross-bar and has pivot-sockets for the ends of a spring-latch 17. This latch-plate is also provided with cam-surfaces 18, the ends of the spring-latch projecting through the pivot-sockets sufficiently to allow of a lateral separation without displacement of the side parts of the latch by contact with the cam-surfaces 18, the metal of the latch having sufficient resiliency to hold the latch in its lowermost position by reason of the contact of the side parts with the cam-surfaces. This spring-latch is adapted to embrace the neck-bar 8 and hold it in position. An anchor-plate 19 overlies the mortise 9 and the upper end of the neck-bar 7 and has an overturned portion 20 lying within the mortise or slot 9 and against the edge of said neck-bar. A supporting-bolt 21 is inserted in the edge of the neck-bar and is bent so as to extend along the edge of the bar and project through the anchor-plate, the plate being attached to the bar by means of a nut secured to the end of the bolt. The overturned portion 20 serves to hold the plate in proper alinement on the top cross-bar and, in connection with the supporting-bolt 21, supports the cross-bar in a manner to prevent splitting of the latter.

In the use of the device, a creature being led into the stall, the neck-bar 8 having previously been disengaged from the upper cross-bar, the head of the animal is placed with the neck opposite the neck-bar 7. The neck-bar 8 is now swung upward, the rounded portion 22 engaging the end of the spring-latch, forcing the latter upward, which as soon as the neck-bar 8 has reached its final position springs downward by reason of the contact of the sides of the latch with the cam-surfaces 18 on the latch-plate. The bolt 14 rests within the notch 13 and holds the side bar firmly against any lengthwise movement.

In Fig. 7 there is shown a modified form of the invention in which the latch-plate 23 serves the double purpose of an anchor-plate for the supporting-bolt 24 and for the latch 25. A spring 26 may be employed in this instance to hold the latch in its normal position.

The construction of the anchor-plate overlying the edges of the mortise or slot in the top cross-bar and the peculiar mode of attachment of said plate to the neck-bar provides an extremely rigid structure, this construction preventing any liability of the breaking down of the stanchion crosswise or in a diagonal direction. Any strain tending to such a result is withstood by the anchor-plate resting against the surface of the top cross-bar and also by the bolt extending along the edge of the neck-bar.

I claim as my invention—

1. In a stanchion, in combination with a support therefor, top and bottom cross-bars, a neck-bar connecting the cross-bars, a neck-bar pivoted to one of said cross-bars and adapted to lie between prongs on the opposite cross-bar, a latch-plate secured to the cross-bar, cam-surfaces supported by the said bar in operative relation to a spring-latch, and the spring-latch pivoted to the latch-plate and adapted to engage said cam-surfaces whereby the latch is held in position to embrace the end of the pivoted neck-bar.

2. In a stanchion, in combination with a support, top and bottom cross-bars, a neck-bar pivoted to one of said cross-bars, means for holding said neck-bar in engagement with the opposite cross-bar, a neck-bar secured to each of said cross-bars, a supporting-plate covering a mortise in one of said cross-bars, and a bolt in engagement with the edge of the cross-bar and extending therealong through the supporting-plate, and means for uniting the bolt and plate.

3. In a stanchion, in combination with a support therefor, top and bottom cross-bars, a neck-bar pivoted to one of said cross-bars, means for holding said neck-bar in engagement with the opposite cross-bar, a neck-bar secured to said cross-bars, a supporting-plate covering a mortise in one of said cross-bars and having an overturned portion lying against the edge of the neck-bar, a bolt extending along the opposite edge of the neck-bar and through said supporting-plate and means for holding the plate and bolt in engagement.

4. In a stanchion, in combination with a support therefor, top and bottom cross-bars, mortises in said cross-bars, a neck-bar located in said mortises and adjustable lengthwise thereof, a supporting-plate covering said mortises, a bolt in engagement with the edge of the neck-bar and extending through the supporting-plate, means for uniting the supporting-plate and bolt, means for holding the neck-bar in the mortises, a neck-bar pivoted to one of said cross-bars and adapted to engage a bifurcation in the opposite cross-bar, and means for holding the pivoted neck-bar in engagement with the bifurcation.

5. In combination, a frame-like structure including a side bar pivotally supported, a swinging latch supported in operative relation to said side bar and composed of resilient material, and having side parts laterally separable, and means for separating the side parts.

6. In combination in a frame-like structure, including a side bar pivotally supported, a latch-plate located in operative relation to said pivoted side bar, a spring-latch pivoted to said plate and having laterally-separable side parts, and cams arranged on the latch-plate and adapted to engage the side parts of the latch in the swinging movement thereof.

7. In combination, end bars, a side bar secured to said end bars, a side bar pivoted to one of said end bars, and a swinging latch secured to the opposite end bar in position to engage the pivoted side bar and composed of resilient material, the side bars of the latch being laterally separable, and means for separating said side bars of the latch.

8. In combination, end bars, a side bar connecting said end bars, a side bar pivoted to one of said end bars and adapted to engage the bifurcated end of the opposite end bar and having a notch in its edge, a bolt passing through the prongs of the end bar and engaging said notch, a latch composed of resilient material pivoted to the end bar to engage the swinging side bar, laterally-separable side bars forming part of the latch, and means for separating said side bars.

9. In a frame or like structure in combination, end bars, side bars connecting the end bars, one of said bars being movable with respect to the other, an anchor-plate secured to the side bar and overlying a mortise in the end bar.

10. In a frame or like structure, in combination, end bars, side bars connecting the end bars, one of said bars being movable with respect to the other, an anchor-plate overlying a mortise in an end bar, and a bolt secured in the edge of a side bar and extending therealong and connected to the anchor-plate.

11. In a stanchion in combination with a support, a frame-like structure for the head of an animal and including cross-bars one of which has a slot, neck-bars, one of which is movable with respect to the other and one of which projects into said slot, a cover-plate overlying the slot, and means for securing the cover-plate to the neck-bar.

OLIVER H. ROBERTSON.

Witnesses:
CHAS. L. BURDETT,
ARTHUR B. JENKINS.